United States Patent Office 3,637,619
Patented Jan. 25, 1972

3,637,619
PROCESS FOR THE POLYMERIZATION OF VINYL CHLORIDE
Corrado Mazzolini, Mestre, Sergio Lo Monaco, Vicenza, Luigi Patron and Alberto Moretti, Venice, and Marcello Di Ciolo, Treviso, Italy, assignors to Chatillon-Società Anonima Italiana per le Fibre Tessili Artificiali S.p.A., Milan, Italy
No Drawing. Continuation-in-part of application Ser. No. 811,576, Mar. 28, 1969. This application Feb. 26, 1970, Ser. No. 14,642
Claims priority, application Italy, Feb. 28, 1969, 13,475/69, 13,476/69
Int. Cl. C08f 3/30, 1/62, 1/04
U.S. Cl. 260—85.5     24 Claims

ABSTRACT OF THE DISCLOSURE

Bulk polymerization of vinyl chloride in the presence of a catalytic system comprising an organic hydroperoxide, an alcoholate of an alkali metal and an organic sulphite or a sulphinic acid wherein the polymerization is conducted at a temperature higher than 0° C.

---

This application is a continuation-in-part of application Ser. No. 811,576, filed Mar. 28, 1969.

The present invention relates to a process for the bulk polymerization of vinyl chloride at a temperature higher than 0° C. and represents an improvement over the process disclosed in copending U.S. patent application Ser. No. 811,576, filed on Mar. 28, 1969.

In said copending patent application there is described a process for the bulk polymerization of vinyl chloride at low temperature by using a catalytic system comprising an organic hydroperoxide, an alcholate of an alkali metal in which the alkyl radical may have a linear or branched chain with 1 to 6 carbon atoms, and:

(a) an organic sulphite of the general formula:

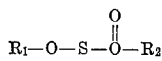

wherein $R_1$ and $R_2$ may be, independently of each other, either a simple or substituted, linear or branched alkyl or cycloalkylic radical, such radicals having from 1 to 12 carbon atoms; or (b) a sulphinic acid of the general formula:

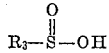

or one of its esters, in which $R_3$ may be a simple or substituted, linear or branched alkyl radical, a cycloalkyl radical or an aryl radical, such radicals having from 1 to 12 carbon atoms.

As stated in the above-mentioned copending application, the alcoholate of the alkali metal may be substituted by the hydroxide of the same alkali metal, provided that such a hydroxide be fed into the reaction mixture in alcoholic solution.

It has now been found that this catalytic system proves to be an effective initiator of bulk polymerization of vinyl chloride even when the polymerization temperature is higher than 0° C.

As stated in the copending application Ser. No. 811,576, by organic hydroperoxide is meant an organic compound having the general formula R—O—O—H, in which R may be a linear or branched alkyl radical, a cycloalkyl radical, an aryl radical or an aryl-alkyl radical.

Examples of organic compounds of the general formula R—O—O—H which may advantageously be used in the polymerization process of this invention, are: methyl-, ethyl, n.propyl-, tert.butyl-, n.butyl-, amyl-, hexyl-, octyl-, etc. hydroperoxide, ethyl-benzyl-hydroperoxide, isobutyl-benzyl hydroperoxide, phenyl - isopropyl - hydroperoxide, etc. Particularly advantageous results are achieved by using cumene-hydroperoxide or tert.butyl-hydroperoxide.

The concentration of organic hydroperoxide is not critical and typically may vary between 0.01 and 3% by weight with respect to the monomers fed. Concentrations not higher than 0.4% are preferred.

The organic hydroperoxide may be fed to the reaction mixture either as such or in solution in a suitable inert solvent such as methyl, ethyl or propyl alcohol, hexane, etc.

There are many organic sulphites, sulphinic acids or their esters having the above-mentioned general formula that may be advantageously used together with the organic hydroperoxide and with an alkali metal alcoholate or hydroxide. Among these may be mentioned dimethyl-sulphite, diethyl-sulphite, di-n-propyl-sulphite, di-tert, butyl-sulphite, and butyl-ethyl-sulphite, di-amyl-sulphite, di-dodecyl-sulphite, di-cyclohexyl-sulphite, di-(β phenyl-ethyl)-sulphite, etc., methane-sulphinic acid, benzene-sulphinic acid, p-methyl-benzene-sulphinic acid, etc., as well as the corresponding alkyl- or aryl-esters such as methyl-, ethyl-, propyl-, butyl-sulphinates.

As stated in said copending application, among the numerous organic sulphites and sulphinic acids or their esters, having the aforementioned general formula, the dialkyl sulphites in which the alkyl radical has 1 to 4 carbon atoms have given the best results.

The concentrations of the said sulphur compounds having the general formula:

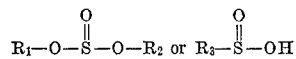

as defined above, may vary between 0.01% and about 2% by weight with respect to the monomers present.

Amounts comprised between 0.035 and 1% by weight are particularly preferred. Quantities higher than 2% by weight may also be used but they are practically not advisable since no appreciable increase in the reaction rate and only a higher consumption is thus obtained.

The alcoholates of an alkali metal, such as specified above, comprise the methylates, ethylates, propylates, isopropylates, tert.-butylates, n.butylates, n.amylates, tert. amylates and the like, of sodium, of potassium, of lithium, etc.

Among the alcoholates of an alkali metal, those having a carbon atom number between 1 and 4, are preferred for reasons of solubility and of these sodium or potassium methylate or ethylate are most preferred. The alcoholate concentration in the reaction medium may vary between 0.01% and 3% by weight with respect to the monomers. Quantities between 0.025 and 0.5% are preferred.

These alcoholates can be fed to the reaction medium either as such or, better still, dissolved in an inert organic solvent. In this last case it is preferred to dissolve the alcoholate in an aliphatic alcohol having from 1 to 5 carbon atoms, such as methyl alcohol, ethyl alcohol, etc.

The nature and quantity of said organic solvent has no influence on the course of polymerization although for economic reasons, concentrated solutions of alcoholates are preferred.

When a hydroxide of an alkali metal is used in place of the alcoholate, such a hydroxide is fed into the reaction mixture dissolved in an aliphatic alcohol. For practical reasons, as solvents, aliphatic alcohols having from 1 to 5 carbon atoms are preferred, and amongst these methyl and ethyl alcohols are particularly preferred. The nature and the quantity of these solvents have no influence on the polymerization course even if, for economic reasons, concentrated solutions are used. Under this aspect, the preferred solvent is methyl alcohol by means of which it is possible to obtain solutions containing more than 10% by weight of the hydroxide.

Among the hydroxides of the alkali metals, sodium or potassium hydroxides are preferred.

The concentration of hydroxide in the reaction mixture may vary between about 0.03% and about 2% by weight referred to the monomeric system. Concentrations between 0.5% and 1% by weight are preferred.

The catalytic system used in the process of the present invention offers the advantage, in comparison to the known catalysts commonly used in the bulk polymerization of vinyl chloride, of allowing regulation of the molecular weight of the polymer by modifying the ratios between the various components of the catalytic system without remarkably influencing the polymerization rate.

The temperature at which the polymerization is carried out may vary between 0° C. and about 100° C., preferably between 20° C. and 60° C.

By the term "bulk polymerization" is meant not only the polymerization carried out in the undiluted monomer but also in the presence of non-reacting organic compounds which are liquid at the polymerization temperature and exert a fluidizing action on the polymerization mass in order to render the latter more easily stirrable. The presence of such organic compounds has no influence on the polymerization reaction and their concentration, if desired, can even be equal to that of the monomer.

As fluidizing organic compounds the following substances may be used: aliphatic hydrocarbons, aryl hydrocarbons, cycloalkyl hydrocarbons, halogenated saturated hydrocarbon; the latter being preferred.

Alkyl mercaptans, when desired, may be added to the polymerization mass in small quantities, such as e.g. from 50 to 1,000 p.p.m. with respect to the monomer, in order to regulate the molecular weight of the polymer. It has been observed that the alkyl mercaptans act not only as chain regulators but also as fluidizers for the polymerization medium. Among the alkyl mercaptans, the preferred ones are those having 1 to 15 carbon atoms and among these the best results are obtained with the ones having at most 4 carbon atoms.

It is advisable to carry out the polymerization in the absence of oxygen which exerts an inhibiting effect on the polymerization. In general, for this purpose, suitable inert gases such as e.g., nitrogen, are used.

The bulk polymerization may in practice be conducted continuously, semi-continuously or batchwise.

The polymerization can be inhibited at the desired stage and at the desired molecular weight, by treating the reaction mass with an aqueous or alcoholic solution of a hydroxylamine salt, preferably hydroxylamine hydrochloride or sulphate.

It is to be understood that the catalytic system used in the process according to the present invention may advantageously also be applied to the preparation of copolymers of vinyl chloride containing up to 50% by weight of at least one other ethylenically unsaturated monomer copolymerizable with vinyl chloride. The only difference in such a case is that the starting monomeric material is a mixture of vinyl chloride and one or more other ethylenically unsaturated monomers copolymerizable therewith. By the term "ethylenically unsaturated monomers" are meant organic compounds containing the C=C group. Examples of such compounds are vinyl and vinylidene compounds such as vinylidene chloride or fluoride, vinyl fluoride, vinyl esters of aliphatic carboxylic acids containing from 2 to 18 carbon atoms, such as, for instance, the vinyl esters of acetic acid, propionic acid, etc., the acrylic type monomers such as acrylic acid, methacrylic acid and their derivatives such as acrylonitrile, acrylates or methacrylates of aliphatic alcohols containing from 1 to 12 carbon atoms, and especially methyl acrylate and methyl methacrylate, etc.

In order to better illustrate the present invention the following examples are given:

EXAMPLES 1–4

Into a 3-liter autoclave provided with an outer heating jacket, an agitator and a thermostatic control, previously charged with 2,000 g. of vinyl chloride and 500 g. of ethyl chloride, the following substances are fed for 10 hours:

An organic hydroperoxide of the type and with the feeding rate reported in Table I.

A sulphur compound of the type and with the feeding rate reported in Table I.

An alkali alcoholate of the type and with the feeding rate reported in Table I.

The alcoholate is fed in a 10% solution in the corresponding alcohol.

At the end of feeding, the slurry thus obtained is discharged into an aqueous solution of hydroxylamine hydrochloride kept at 50° C. and pH 6 by addition of sodium bicarbonate in order to stop the polymerization. The polymer is separated by centrifugation and then washed with water and dried, at 70° C. in an oven provided with forced ventilation.

The polymerization conversion and the intrinsic viscosity $[\eta]$ of the polymer obtained are reported in Table I.

The intrinsic viscosity is determined in cyclohexanone at 30° C. and is expressed in dl./g.

TABLE I

| Organic hydroperoxide | | Sulphur compound | | Alkali alcoholate | | Temp., °C. | $[\eta]$ dl./g. | Conversion, percent |
|---|---|---|---|---|---|---|---|---|
| Type | G./h. | Type | G./h. | Type | G./h. | | | |
| Tert.butyl hydroperoxide | 0.2 | Dimethyl sulphite | 0.25 | Sodium methylate | 0.24 | 20 | 1.15 | 20 |
| Do | 0.2 | do | 0.25 | do | 0.48 | 20 | 1.45 | 21 |
| Do | 0.2 | Diethyl sulphite | 0.30 | do | 0.24 | 30 | 1.20 | 22 |
| Do | 0.3 | Dimethyl sulphite | 0.30 | Sodium ethylate | 0.35 | 50 | 1.4 | 39 |

EXAMPLES 5–8

Into a 3-liter autoclave provided with an outer heating jacket, an agitator and a thermostatic control, previously charged with 2,000 g. of vinyl chloride and 500 g. of ethylchloride, the following substances are fed for 10 hours:

an organic hydroperoxide of the type and with the feeding rate reported in Table II.

a sulphur compound of the type and with the feeding rate reported in Table II.

an alkali hydroxide of the type and with the feeding rate reported in Table II.

The alkali hydroxide is fed in a 10% methanol solution.

At the end of the feeding, the suspension of polymer thus obtained is discharged into an aqueous solution of hydroxylamine hydrochloride, kept at 50° C. and at pH 6 by addition of sodium bicarbonate in order to stop the polymerization.

The polymer is separated by centrifugation and then washed with water and dried at 70° C. in an oven provided with forced ventilation.

The polymerization conversion and the intrinsic viscosity $[\eta]$ of the polymer obtained are reported in Table II.

The intrinsic viscosity [η] is determined in cyclohexanone at 30° C. and is expressed in dl./g.

TABLE II

| Organic hydroperoxide | | Sulphur compound | | Alkali hydroxide | | Temp., °C. | [η] | Conversion, percent |
| --- | --- | --- | --- | --- | --- | --- | --- | --- |
| Type | G./h. | Type | G./h. | Type | G./h. | | | |
| Tert.butyl hydroperoxide | 0.2 | Dimethyl sulphite | 0.25 | Sodium hydroxide | 0.20 | 60 | 1.2 | 35 |
| Do | 0.2 | ____do____ | 0.25 | ____do____ | 0.4 | 60 | 1.50 | 36 |
| Do | 0.25 | Dipropyl sulphite | 0.4 | ____do____ | 0.35 | 40 | 1.15 | 26 |
| Do | 0.3 | Diethyl sulphite | 0.35 | ____do____ | 0.3 | 20 | 1.3 | 22 |

What is claimed is:

1. A process for the bulk-polymerization of vinyl chloride, the polymerization being conducted in the presence of a catalytic system comprising an organic hydroperoxide, in a concentration varying from 0.01% to 3% with respect to the monomers, an alcoholate of an alkali metal in which the alkyl radical may have a linear or branched chain having from 1 to 6 carbon atoms in a concentration varying from 0.01% to 3% with respect to the monomers, or an alkali metal hydroxide in a concentration varying from 0.03% to 2% by weight with respect to the monomers, in solution in a linear or branched chain alcohol having from 1 to 5 carbon atoms, and from 0.01% to 2% by weight with respect to the monomers of:

(a) an organic sulphite of the general formula:

$$R_1-O-\overset{O}{\underset{\|}{S}}-O-R_2$$

wherein $R_1$ and $R_2$ may be, independently of each other, either a simple or substituted, linear or branched alkyl radical or a cycloalkylic radical such radicals having from 1 to 12 carbon atoms; or (b) a sulphinic acid of the general formula:

$$R_3-\overset{O}{\underset{\|}{S}}-OH$$

or one of its esters, in which $R_3$ may be a simple or substituted linear or branched alkyl radical, or a cycloalkyl- or aryl-radical such radicals having from 1 to 12 carbon atoms, wherein the polymerization is conducted at a temperature between 0° C. and about 100° C.

2. Process according to claim 1, wherein the alkali metal alcoholate is fed in solution in an inert organic solvent.

3. Process according to claim 2, wherein as the inert organic solvent of the alcoholate there is used an aliphatic alcohol having from 1 to 5 carbon atoms.

4. Process according to claim 3, wherein the aliphatic alcohol is methyl or ethyl alcohol.

5. Process according to claim 1, wherein as the alkali metal alcoholate, a short chain alcoholate, having from 1 to 4 carbon atoms, is used.

6. Process according to claim 5, wherein as the alkali metal alcoholate, sodium or potassium methylate or ethylate is used.

7. Process according to claim 1, wherein said concentration varies from 0.025% to 0.5% by weight with respect to the monomers.

8. Process according to claim 1, wherein the alkali metal hydroxide is fed in a methanolic solution.

9. Process according to claim 1, wherein as the alkali metal hydroxide is used sodium or potassium hydroxide.

10. Process according to claim 1, wherein the concentration of the alkali metal hydroxide varies from 0.05% to 1% by weight with respect to the monomers.

11. Process according to claim 1, wherein the concentration of the organic hydroperoxide is not higher than 0.4% by weight.

12. Process according to claim 1, wherein said concentration varies between 0.035% and 1.0% by weight with respect to the monomers.

13. Process according to claim 1, wherein as the organic sulphite compound of the general formula:

$$R_1-O-\overset{O}{\underset{\|}{S}}-O-R_2$$

there is used a dialkyl-sulphite in which the alkyl radical has from 1 to 4 carbon atoms.

14. Process according to claim 1, wherein as the organic hydroperoxide, there is used cumene-hydroperoxide or tert.butyl-hydroperoxide.

15. Process according to claim 1, wherein the organic hydroperoxide is fed in solution in a suitable inert solvent.

16. Process according to claim 15, wherein the inert solvent is methyl or ethyl alcohol.

17. A process according to claim 1, wherein the polymerization is carried out in the presence of a fluidizing organic compound.

18. Process according to claim 17, wherein the fluidizing organic compound is a saturated halogenated compound.

19. A process according to claim 1, wherein 50 to 1,000 p.p.m., with respect to the monomer, of an alkyl mercaptan containing 1 to 15 carbon atoms are fed to the polymerization mass.

20. A process according to claim 19, wherein the alkyl mercaptan contains at most 4 carbon atoms.

21. A process according to claim 1, wherein the polymerization is inhibited at the desired level by treating the polymerization mixture with an aqueous or alcoholic solution of a hydroxylamine salt.

22. A process according to claim 21, wherein the salt is hydroxylamine, hydrochloride or sulphate.

23. A process according to claim 1, wherein vinyl chloride is copolymerized with up to 50% of at least one other copolymerizable ethylenically unsaturated monomer.

24. A process according to claim 1, wherein the temperature is 20° C. to 60° C.

References Cited

UNITED STATES PATENTS 3,255,164    3/1966    Visger et al. _____ 260—87.5

JOSEPH I. SCHOFER, Primary Examiner

J. A. DONAHUE, Jr., Assistant Examiner

U.S. Cl. X.R.

260—86.3, 87.1, 87.5 A, 87.7, 92.8

UNITED STATES PATENT OFFICE
CERTIFICATE OF CORRECTION

Patent No. 3,637,619      Dated January 25, 1972

Inventor(s) CORRADO MAZZOLINI et al

It is certified that error appears in the above-identified patent and that said Letters Patent are hereby corrected as shown below:

The priority claim in the heading should read:

--Claims priority, applications Italy,

April 3, 1968, No. 14,761 A/68

May 6, 1968, No. 16,142 A/68

February 28, 1969, No. 13,475 A/69

February 28, 1969, No. 13,476 A/69--

Signed and sealed this 10th day of July 1973.

SEAL)
ttest:

DWARD M. FLETCHER, JR.          Rene Tegtmeyer
ttesting Officer              Acting Commissioner of Patents